United States Patent [19]
Cowett, Jr.

[11] 3,836,836
[45] Sept. 17, 1974

[54] METHOD FOR NUCLEAR RADIATION HARDENING OF DC-TO-DC CONVERTERS

[75] Inventor: Philip M. Cowett, Jr., Silver Spring, Md.

[73] Assignee: The United States of America as represented by the Secretary of the Army, Washington, D.C.

[22] Filed: Feb. 16, 1973

[21] Appl. No.: 333,234

[52] U.S. Cl. .................. 321/44, 323/4, 307/297, 331/113 R
[51] Int. Cl. ............................................. H02m 3/32
[58] Field of Search ....... 321/44; 323/4; 331/113 R, 331/62; 307/297

[56] References Cited
UNITED STATES PATENTS
3,387,229   6/1968   Corey ............................ 321/44 X
3,679,963   7/1972   Free et al. ............................ 323/4

*Primary Examiner*—Gerald Goldberg
*Attorney, Agent, or Firm*—Edward J. Kelly; Herbert Berl; Saul Elbaum

[57] ABSTRACT

A novel technique for nuclear radiation hardening DC-to-DC converters is disclosed, the technique being particularly applicable to battery powered DC-to-DC transistor converters of the common emitter type having the collector-emitter paths of two transistors connected together in a current loop including an output transformer, and having a base drive circuit including a feedback winding coupled to the base of each transistor to effect oscillation of the converter. Such circuits, when placed in a nuclear environment, suffer adverse affects, particularly as concerns transistor gain, saturation voltage drop, and regulator output. The adverse affects accompanying incident nuclear radiation can be compensated for and largely cancelled by the provision of a regulating secondary winding assembly electrically disposed across the respective bases of each of the two transistors, which secondary winding assembly is magnetically coupled to the output transformer and includes oppositely poled series diodes, and by further connecting a Zener reference diode between the electrical midpoint of the regulating winding assembly and ground.

2 Claims, 2 Drawing Figures

PATENTED SEP 17 1974 3,836,836

METHOD FOR NUCLEAR RADIATION HARDENING OF DC-TO-DC CONVERTERS

The invention described herein may be manufactured, used and licensed by or for the United States Government for governmental purposes without the payment to me of any royalty thereon.

BACKGROUND OF THE INVENTION

This invention generally relates to the field of nuclear radiation hardening of apparatus and particularly concerns the provision of a technique whereby a DC-to-DC converter circuit can be nuclear radiation hardened, whereby the adverse affects of incident nuclear radiation thereon can be compensated for and substantially cancelled.

DC-to-DC converters of the battery-powered variety are typically utilized in environments whereby the power supply may be exposed to various amounts of nuclear radiation. Typical applications of this type are missile fuzes, and the like. Exposure of such power supply to incident nuclear radiation invariably brings about adverse affects as concerns operational stability and reliability of the power supply. Regulation of the DC-to-DC converter is therefore necessary, though prior art approaches to the design of regulated DC-to-DC converters have not recognized this special need for radiation "hardening" of such circuits, but rather have approached the problem of regulation from the standpoint of compensating for temperature variations of the circuit components, variations in the input supply voltage, and other conventional criteria.

Prior art regulated DC-to-DC converters generally fall within two broad categories. One prior art approach to the design of a regulated converter is to utilize a series regulator to regulate the input voltage and/or the output voltage from the converter. In such designs, two series transistors are typically provided, one transistor being the regulator pass transistor, the other transistor being the conducting converter transistor.

Another typical prior art regulated converter design makes use of a standard common-emitter DC-to-DC transistor converter having the collector-emitter paths of two transistors connected together in a current loop including an output transformer, and having a base drive circuit including a feedback winding coupled to the base of each transistor to effect oscillation of the converter, some regulating mechanism being provided as concerns the transistor base drive.

Each of the two above-mentioned general regulated DC-to-DC converter types possess respective advantages and disadvantages as concerns regulatory operation and response characteristics and, as such, the user of such converters can under normal circumstances readily select a particular prior art design which is specifically suited in a given utilization environment wherein temperature instability may be a problem, or wherein input voltage stability may be a problem, or the like. The selection of a suitable regulated DC-to-DC converter for utilization in a nuclear radiation environment cannot be so simply resolved.

For example, in the regulated DC-to-DC converter of the type wherein a series regulator is utilized having the regulator pass transistor and the conducting converter transistor as above-discussed, the efficiency of the circuit is limited by the saturation voltage drops across these two transistors. This is of little consequence in a converter operating from a relatively high battery voltage source and which is not subject to exposure to various amounts of nuclear radiation. After exposure to nuclear radiation, the saturation voltage drop across the transistors may rise to several volts or more, particularly in high power circuits, and the available battery voltage is reduced by the sum of the saturation voltage drops across these two transistors, lowering efficiency considerably. Accordingly, converter designs of this type generally are not looked to where radiation resistance is a requirement.

Regulated DC-to-DC converters of the other general type above-described, i.e., the base-drive regulated type, show better promise with respect to applications requiring nuclear hardness in that the converter transistors are themselves utilized as series regulators in the base-drive regulating circuit and therefore, only one saturation voltage drop occurs to reduce available voltage.

Nevertheless, those skilled in the state of the art are not aware of or oriented to the characteristic of nuclear hardness of DC-to-DC transistor converters and generally assume that no such available regulated transistor converter can operate properly after exposure to nuclear radiation in view of the inherently adverse affects of nuclear radiation on saturation voltage of transistors as well as transistor gain.

SUMMARY OF THE INVENTION

It is a primary objective of the instant invention to demonstrate how existing technology can be utilized to generate electrical power and ensure stable operating characteristics thereof in an environment of nuclear radiation.

It is a further objective of the instant invention to provide a technique by which regulated DC-to-DC transistor converters can be nuclear hardened.

Yet another objective of the instant invention concerns the description of a design technique and criteria therefor by which the adverse affects of nuclear radiation on transistorized DC-to-DC regulated converters can be effectively cancelled.

These objectives, as well as others which will become apparent as the description proceeds, are implemented by the novel invention which, as aforestated, constitutes a technique utilizing existing hardware technology by which nuclear hardening results. The technique of the instant invention has specific applicability to battery-powered DC-to-DC transistor converters of the common-emitter type having the collector-emitter paths of two transistors connected together in a current loop including an output transformer, and having a base drive circuit including a feedback winding coupled to the base of each transistor to effect oscillation of the converter.

With such converters, regulation of the base drive is commonly effected as aforestated, and numerous different techniques of effecting the base drive regulation exist, one of such techniques, for example, being that depicted in U.S. Pat. No. 3,387,229 wherein a regulating secondary winding assembly is electrically coupled across the respective bases of each of the two transistors, which secondary winding assembly is magnetically coupled to the output transformer and includes oppositely poled series diodes, and wherein a Zener reference diode is disposed between the electrical midpoint of the regulating winding assembly and ground.

From among the numerous base drive regulating circuits currently available, it has been discovered that the aforementioned circuit type utilizing the regulating secondary winding assembly and the Zener reference diode possesses characteristics which, through suitable design criteria as taught herein, effectively results in a nuclear hardened DC-to-DC regulated transistor converter which is not adversely affected and will continue to operate after exposure to various amounts of nuclear radiation.

BRIEF DESCRIPTION OF THE DRAWINGS

The invention itself will be better understood and further features and advantages thereof will become apparent from the following detailed description of a preferred inventive embodiment, such description making reference to the appended drawings wherein.

DETAILED DESCRIPTION OF A PREFERRED INVENTIVE EMBODIMENT

Figure 1:
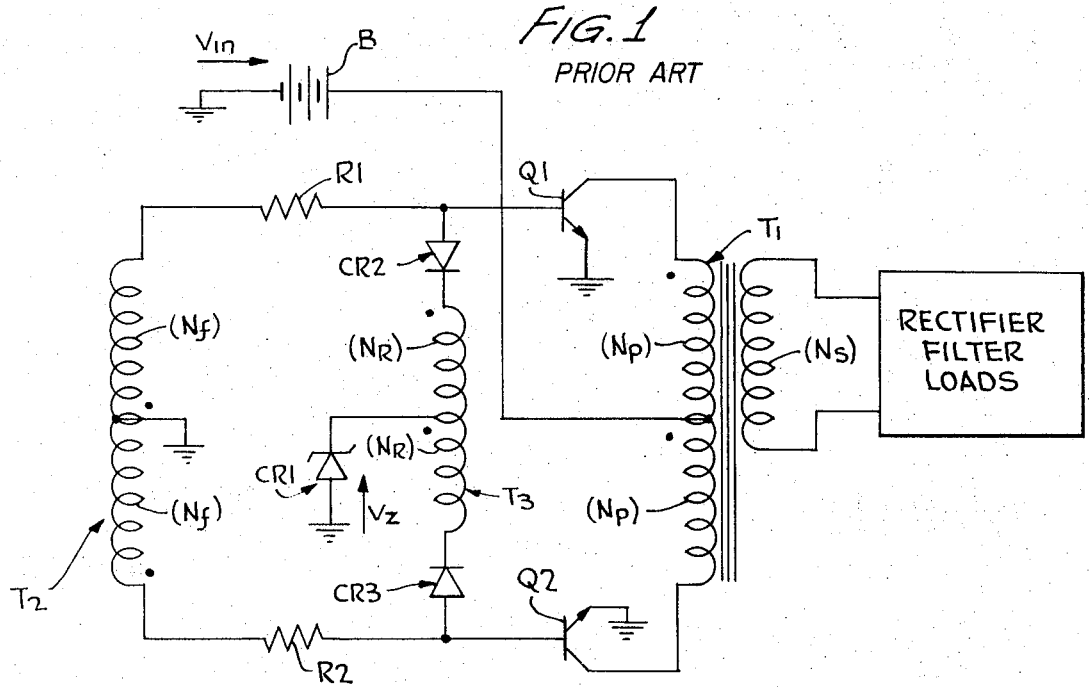
FIG. 1 is a schematic electrical circuit diagram of an existing regulated DC-to-DC transistor converter useful in explaining the design criteria and techniques by which the unexpected property of nuclear hardness has been discovered.

Referring to FIG. 1 of the drawings, a basic regulated converter circuit is shown, the circuit being of the standard common-emitter type discussed above, having a simple base drive regulating circuit consisting of diodes CR2 and CR3, Zener diode CR1, and an associated secondary transformer winding T3, which is the regulator winding.

Without the regulation circuit, the converter operates as a normal unregulated converter with positive feedback to sustain oscillation being applied from the feedback winding T2 through base-drive resistors R1 and R2 to the bases of transistors Q1 and Q2. One transistor conducts until the core of output transformer T1 saturates, removing base drive from the conducting transistor. The magnetic flux in the core of transformer T1 then collapses, inducing a voltage in the opposite direction across the feedback winding T2, turning on the opposite transistor. Current through the opposite transistor increases the voltage across its associated half of the transformer primary, inducing more voltage in the feedback winding T2, and increasing the base drive. This process continues until the transistor saturates. This transistor then conducts until the core of T1 saturates, and the operation repeats.

The circuit of FIG. 1, however, does not start oscillating by itself. A start-up circuit, which supplies initial forward bias to one or both transistor base-emitter junctions, is usually included in the design of such DC-to-DC converters. Speed-up and de-spiking circuits are also typically used, though these non-essential circuits have been omitted from FIG. 1 for simplicity.

When the regulation circuit is added, converter operation is unaffected as long as the voltage across one half of the regulator winding T3 indicated by turns ($N_R$) never exceeds the breakdown voltage of Zener diode CR1. Assuming that $V_{CR2} = V_{BE}$, this will occur when $$V \text{ in} < V_Z (N_P/N_R) \tag{1}$$

The voltage $V_Z (N_P/N_R)$ is the input voltage at which regulation begins; that is, the output voltage will remain constant as input voltage effected by battery B is increased above this point.

Figure 2:
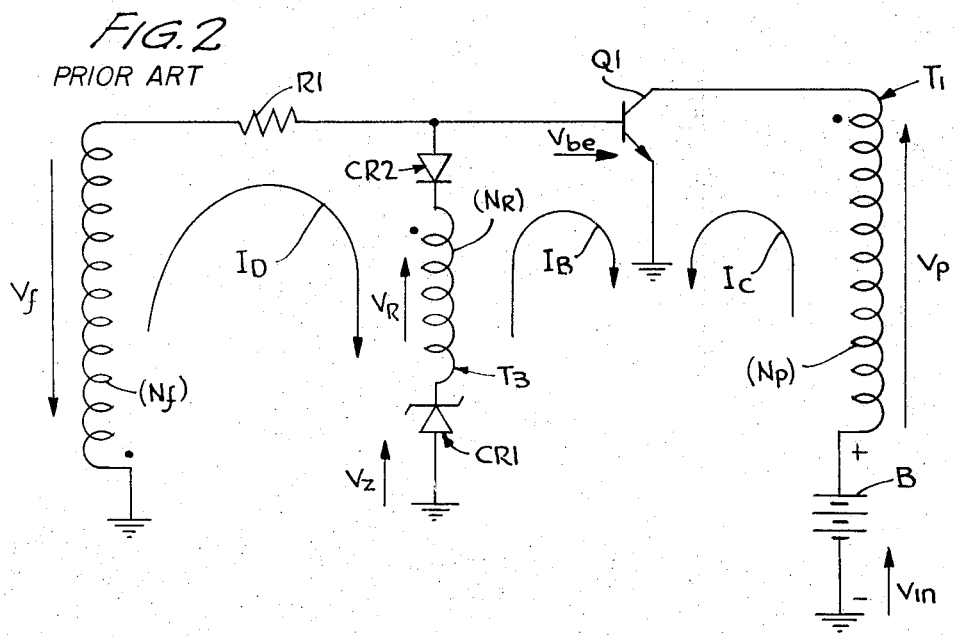
FIG. 2 is a simplified circuit schematic based upon that shown in FIG. 1.

Assuming transistor Q1 is conducting, a simplified converter schematic for this condition is shown in FIG. 2, and attention is therein invited. The equation for the base-current loop is $$V_{CR1} - V_R + V_{CR2} - V_{BE} = 0 \tag{2}$$

If it is assumed that $V_{BE}$ is equal to the forward drop across diode CR2, then $$V_{CR1} = V_R = V_Z \tag{3}$$

if transistor Q1 is to conduct and the regulation circuit is to function. If $V_R$ should increase, current will increase in diodes CR1 and CR2, and the regulation winding T3. Since drive current is only slightly affected by small changes in transformer winding voltages, $$I_D = V_F - V_{BE}/R1 \tag{4}$$

$$I_D \approx V_F/R1 \qquad V_{BE} << V_F \tag{5}$$

the increase in regulator current causes a net decrease in base current. This decrease in base current causes a decrease in collector current, which causes $V_R$ to decrease. Of course, if there is insufficient input voltage for $V_R$ to equal $V_Z$ (Eq. 1), diodes CR1 and CR2 do not conduct, the full drive current is applied to the base, and transistor Q1 saturates. Thus, if there is sufficient input voltage, $V_R$ is regulated. This, in turn, regulates all other transformer voltages. This implies that drive current and Zener current also remain constant with changes in input voltage. Since $I_B$ changes with changes in load current and transistor gain $h_{FE}$, $I_D$ should be made large with respect to $I_B$ to keep Zener current constant. Since the temperature coefficient of diode CR2 closely matches that of $V_{BE}$, the overall temperature coefficient for the converter will be approximately that of the Zener diode CR1.

It has been found that Equation (2) may be used to predict the performance of this typical converter circuit after exposure to radiation, as well as temperature, load current, and the like. Specifically, this prediction equation can be written $$V_z(I_D - I_B) - V_R + V_{CR2}(I_D - I_B) - V_{BE}(I_C) = 0 \tag{6}$$

(parentheses indicate functional relationship rather than multiplication.)
where $$I_B = I_C/h_{FE} \tag{7}$$

It is therefore possible to design a radiation-hardened converter using this basic circuit. A suitable transistor should first be selected. This transistor should be rated to handle the required voltage, current and power, and should have a saturation voltage that is small with respect to the minimum input voltage, and a gain $h_{FE}$ as large as possible, after radiation.

One must further insure that the transistors will not saturate. To do so, the approximate full load collector current must be determined and, from this, the worst-case post-radiation saturation voltage. Subtract this voltage from the minimum input voltage from which operation is necessary. This result, less a small safety margin, is the optimum primary voltage ($V_P$). From this voltage, a more accurate value of collector current can be obtained, and the above process should be repeated.

From this value of collector current so obtained and manufacturer's data, one must further determine the worst-case gain $h_{FE}$ and $V_{BE}$ for the maximum radiation level and minimum operating temperature, and the base current corresponding to these conditions from Equation (7). The feedback voltage $$V_F = V_P (N_F/N_P) \qquad (8)$$

should be large with respect to the worst-case $V_{BE}$; about 4 volts is usually a good value. If an additional diode is included in the drive-current loop for the start-up circuit, this voltage should be increased to 6 volts or so. If a start-up diode is employed, a hardened type should be chosen, and Equation (4) becomes $$I_D = V_F - V_{BE} - V \text{ start-up diode}/R_1 \qquad (9)$$

A valve of $I_D$ should be selected which exceeds the worst-case base current by a substantial margin. A two-to-one or greater margin is desirable, but may not be practical for efficiency reasons if gain $h_{FE}$ drops to very low values after radiation. If base-drive power becomes a substantial part of the total converter input power, due to very low gain $h_{FE}$, the valve of collector current will increase, and this must be taken into account in the calculations. The power dissipated in the Zener diode CR1, which will usually be of the same order-of-magnitude as the base drive power, should also be taken into account. From the chosen value of $I_D$ and worst-case values of $V_{BE}$ and $V$ start-up diode (if used), determine $R_1$ from Equation (4) or Equation (9), whichever is applicable.

The Zener diode CR1 should be chosen next. As a rule, most Zener diodes are affected little by radiation, and if the radiation specification is not too high, they may be assumed to be unaffected. Since Zener current may vary by 2-to-1 or more after radiation, the chosen diode should have a fiarly sharp "knee." Diodes with a $V_Z$ of around 5 volts have the best temperature coefficients, but they may not have a good knee. A higher voltage diode will reduce efficiency because $V_R$ must be increased. The larger $V_Z$ is, though, the less significant the difference between $V_{CR2}$ and $V_{BE}$ becomes (see Equation [6]). One or more forward diodes may be placed in series with CR1 to obtain temperature compensation. In this case, $V_Z$ would be the Zener voltage plus the forward drops of any series diodes. With $V_Z$ and $V_P$ known, the number of turns on the regulator winding T3 is determined according to $$N_R = V_Z N_P/V_P \qquad (10)$$

if it is assumed that $V_{CR2} = V_{BE}$, a reasonable assumption before radiation. It may be necessary to change $V_Z$ slightly from the originally chosen value to obtain an integral number of turns on the regulator winding.

All components have now been chosen except for diode CR2 and temperature-compensating diodes in series with the Zener, if used. Assume that $V_{CR2} = V_{BE}$, and determine $V_R$ from the preradiation characteristics of the components using Equations (4) or (9), (7) and (6). Then, using this value of $V_R$ and the above equations, determine a value of $V_{CR2}$ using typical post-radiation characteristics of the components. The difference between this voltage and the pre-radiation $V_{BE}$ is the amount $V_{CR2}$ must increase due to radiation, in spite of the fact that the current through diode CR2 decreases after radiation. A suitable diode should be chosen for CR2, this diode being of a fast-switching type if the converter frequency is to be high, and the diode being capable of handling the pre-radiation current. Diodes with higher breakdown voltages tend to be more affected by radiation. If the total change in voltage cannot be achieved reliably with a single diode, one or more diodes can be placed in series with the Zener diode, as was mentioned earlier, for temperature compensation, though these diodes need not be fast-switching types. Their effect on the temperature coefficient of the converter should be taken into account, and a higher voltage Zener diode may be necessary.

Once suitable diodes are chosen, it may be necessary to adjust $V_Z$ if the pre-radiation diode drop and the transistor $V_{BE}$ differ. Now, the regulated voltage $V_R$ should be approximately the same before radiation and after maximum radiation. A constant $V_R$ implies that all transformer voltages are constant, if winding resistance is neglected, usually a reasonable assumption for converter frequencies over 1KHZ. The value of $V_R$ should be calculated at one or two intermediate radiation levels. If the curve of $V_R$ vs. $\phi$ (fast neutron exposure) is not flat enough to meet the specification, or if operation out to higher radiation levels is desired, one or more of the following may be done:

1. Use harder transistors. Since lower power transistors are usually less affected by radiation than higher power units, two or more smaller units may be paralleled. The effect of any emitter resistors must be added into the $V_{BE}$ of Equation (6).
2. Use a higher voltage Zener diode.
3. Increase drive current to provide a larger base-current margin after radiation.
4. Increase $V_F$, R1 and R2 to retain the same drive current, but keep it more constant after radiation. If a start-up diode is used, a more radiation-tolerant one may be selected, or two in parallel may be used.
5. Sometimes the curve of $V_R$ vs. $\phi$ can be improved by allowing $V_R$ to drop slightly after maximum radiation exposure.

It should be remembered that a partial or a complete redesign will be necessary if any of the above changes are made, and that changes 2, 3, and 4 will reduce the efficiency of the converter.

With these teachings in mind, the radiation resistant properties of such typical DC-to-DC converter circuitry as discussed can now be appreciated, and such properties can be enhanced through selection techniques as set forth above.

As should now be appreciated, the objectives set forth at the outset of this specification have been successfully achieved. It should further be understood that the invention is not to be limited to the exact details discussed in the preferred inventive embodiment, for obvious modifications will occur to persons skilled in the art. ACCORDINGLY,

What is claimed is:

1. In an environment of nuclear radiation wherein electrical power is generated by a battery powered DC-to-DC transistor converter of the common-emitter type having the collector-emitter paths of two transistors connected together in a current loop including an output transformer, and having a base drive circuit including a feedback winding coupled to the base of each transistor to effect oscillation of the converter, the method of nuclear hardening the converter so that the output thereof is made resistant to the radiation, said method comprising the steps of placing a regulating secondary winding assembly electrically across the respective bases of each of the two transistors, which secondary winding assembly is magnetically coupled to the output transformer, and includes oppositely poled series diodes; connecting a Zener reference diode between the electrical midpoint of the regulating winding assembly and ground; and setting the pre-radiation electrical parameter values of each said series diode and said Zener diode such that the affect of nuclear radiation on the current/voltage characteristics of said components substantially cancels the affect of nuclear radiation on the current/voltage characteristics of each said transistor, whereby said converter exhibits a substantially flat output voltage/radiation flux curve.

2. A method of generating electrical power and for ensuring stable operating characteristics thereof in an environment of nuclear radiation, said method comprising the steps of:

providing a battery-powered DC-to-DC transistor converter of the common-emitter type having the collector-emitter paths of two transistors connected together in a current loop including an output transformer, and having a base drive circuit including a feedback winding coupled to the base of each transistor to effect oscillation of the converter;

placing the converter in a nuclear environment such that the converter is exposed to incident nuclear radiation whereby the gain of each transistor is adversely affected thereby compensating for and cancelling the effect of nuclear radiation on the transistor gain by providing a regulating secondary winding assembly electrically across the respective bases of each of the two transistors, which secondary winding assembly is magnetically coupled to the output transformer and includes oppositely poled series diodes, connecting a Zener reference diode between the electrical midpoint of the regulating winding assembly and ground; and setting the pre-radiation electrical parameter values of each said series diode and said Zener diode such that said converter generates a substantially flat output voltage/radiation flux curve upon exposure to radiation.

* * * * *